United States Patent
Schmidt

(10) Patent No.: US 8,842,656 B2
(45) Date of Patent: Sep. 23, 2014

(54) COMMUNICATIONS IN OFDMA-BASED WIRELESS RADIO NETWORKS

(75) Inventor: Michael Schmidt, Stuttgart (DE)

(73) Assignee: Alcatel Lucent, Boulogne-Billancourt (FR)

(*) Notice: Subject to any disclaimer, the term of this patent is extended or adjusted under 35 U.S.C. 154(b) by 177 days.

(21) Appl. No.: 13/389,763

(22) PCT Filed: Aug. 6, 2010

(86) PCT No.: PCT/EP2010/061501
§ 371 (c)(1),
(2), (4) Date: Feb. 9, 2012

(87) PCT Pub. No.: WO2011/018419
PCT Pub. Date: Feb. 17, 2011

(65) Prior Publication Data
US 2012/0140760 A1      Jun. 7, 2012

(51) Int. Cl.
*H04B 7/212* (2006.01)
*H04B 1/707* (2011.01)
*H04B 1/7107* (2011.01)
*H04B 1/713* (2011.01)
*H04L 5/00* (2006.01)
*H04W 72/04* (2009.01)
*H04W 4/00* (2009.01)

(52) U.S. Cl.
CPC ......... *H04B 1/707* (2013.01); *H04W 72/0413* (2013.01); *H04W 4/005* (2013.01); *H04B 1/7107* (2013.01); *H04B 1/713* (2013.01); *H04L 5/0016* (2013.01)
USPC ....................................... 370/344

(58) Field of Classification Search
USPC ........................................... 370/344
See application file for complete search history.

(56) References Cited

U.S. PATENT DOCUMENTS

2008/0130519 A1* 6/2008 Bahl et al. .................. 370/254
2008/0293353 A1* 11/2008 Mody et al. .................. 455/1

FOREIGN PATENT DOCUMENTS

| EP | 1 727 329 A1 | 11/2006 |
| WO | WO 01/05051 A1 | 1/2001 |
| WO | WO 2006120600 A1 * | 11/2006 |

OTHER PUBLICATIONS

LTE Product Design, "LTE Benefits v 3.3," Verizon Wireless, pp. 1-8, XP002565166, retrieved from the internet on Jan. 25, 2010.
International Search Report for PCT/EP2010/061501 dated Dec. 2, 2010.

* cited by examiner

*Primary Examiner* — Mark Rinehart
*Assistant Examiner* — Maharishi Khirodhar
(74) *Attorney, Agent, or Firm* — Fay Sharpe LLP

(57) ABSTRACT

The invention relates to a method for transporting a machine-to-machine, M2M, signal (7) over a wireless radio network (1) using an Orthogonal Frequency Division Multiple Access, OFDMA, signal (5), the method comprising: embedding the M2M signal (7) as a spread-spectrum waveform into the bandwidth range of the OFDMA signal (5), and transporting the OFDMA signal (5) containing the M2M signal (7) over the wireless radio access network (1). The invention also relates to a transmission device (2), to a receiving device (2), and to a wireless communication network (1) adapted for implementing the method.

13 Claims, 1 Drawing Sheet

COMMUNICATIONS IN OFDMA-BASED WIRELESS RADIO NETWORKS

FIELD OF THE INVENTION

The invention relates to methods for transporting signals over a wireless radio access network. The invention also relates to transmission devices and receiving devices, both being implemented e.g. in a base station of a wireless radio network, and to wireless radio networks adapted for performing OFDMA.

BACKGROUND

This section introduces aspects that may be helpful in facilitating a better understanding of the invention. Accordingly, the statements of this section are to be read in this light and are not to be understood as admissions about what is in the prior art or what is not in the prior art.

Future OFDMA-based Fourth-Generation (4G) cellular radio access technology families such as 3GPP's Long-Term Evolution (LTE) and 3GPP2 UMB or WiMax may support premium(=expensive) machine-to-machine (M2M) applications in niche areas but are not prepared to support a mass-market cost-efficient wide-area deployment of M2M communications due to the unique needs with regard to: high number/density of machine nodes (e.g. for sensor applications), ultra-low energy consumption, new communication patterns/Quality-of-Service (QoS) demands, ultra-low duty-cycles, highly directional and redundant information streams, and low cost/low complexity systems.

The term M2M communication/signal as used herein relates to communications which require transporting data from a huge number of devices/nodes with a comparatively low data rate (e.g. 10 kb/s or less) over large distances (10 km and more). It is expected that for this purpose, efficient cellular machine-to-machine communications will require radical changes starting from the air interface and from there working upwards, simply because of the unique low cost/low complexity requirements of M2M communications. In particular, there is little chance of success to reduce e.g. the cost/complexity/energy consumption of future OFDMA based RF/PHY/MAC stacks to the needs of M2M sensor applications. Thus, M2M communications will typically require a dedicated air interface.

However, existing standards with regard to machine-to-machine communications are not adequate: For example, short-range Zigbee-like standards (802.15.4 et al.) have only a limited range (typically less than 50 m) and operate in the unlicensed ISM spectrum, such that QoS cannot be guaranteed. Also, re-using the cellular air interface will have a strong impact on battery life (no good sleep states, heavy signal processing) and will result in high-complexity RF/PHY/MAC protocol stacks, as well as high costs per user.

It is an object of the invention to provide: a method for efficiently transporting a machine-to-machine, M2M, signal over an OFDMA-based wireless radio access network.

SUMMARY OF THE INVENTION

This object is met by a method comprising: embedding the M2M signal as a spread-spectrum waveform into the bandwidth range of the OFDMA signal, and transporting the OFDMA signal containing the M2M signal over the wireless radio (access) network.

Thus, the inventor proposes to embed a low-rate spread-spectrum M2M waveform as an efficient radio overlay network to the commercial OFDMA-based radio access signal in the licensed bandwidth, thus allowing re-using existing cell locations/sizes/spectrum allocations and provisioning of efficient RAT internetworking mechanisms on the RF/PHY/MAC layers.

This technical solution allows to make maximum re-use of existing mobile infrastructure and allows to apply sophisticated signal processing on the network side, leveraging the huge base-band processing power/backhauling capability of deployed cellular base-stations, possibly with application of joint detection/transmission techniques of the M2M/cellular signal layers (see below). Thus, the invention allows for minimum capital expenditures/operating expenses for operators also in early phases of M2M rollout, and may thus allow to kick-start a cellular M2M mass-market uptake.

In one embodiment, the spread-spectrum waveform of the M2M signal is embedded into narrow-band, unoccupied time-frequency tiles distributed over the bandwidth range of the OFDMA (baseband) signal. In such a way, a low-rate, multi-kilometer-range frequency-hopped spread spectrum overlay radio M2M network may be provided which sends/transmits on sparse (spatially distributed) narrowband spectrum holes in the (host) system spectrum of an OFDMA-based radio access system (LTE, WiMax, UMB) in a co-ordinated fashion.

The distribution of the narrow-band time-frequency tiles (spectrum holes) over the bandwidth range of the OFDMA signal may be dynamically controlled, i.e. the spectrum holes may be self-managed dynamically by the radio access system/network due to the joint needs of the M2M/host (e.g. LTE) layers.

In one improvement, the narrow-band, unoccupied time-frequency tiles cover a fixed number of sub-carriers of the OFDMA baseband signal. Reserving small groups of OFDMA sub-carriers (e.g. two to four physical resource blocks) may be sufficient for performing M2M communications.

In a further improvement, the narrow-band time-frequency tiles of the M2M signal have a time duration which is an integer multiple of the time duration of an OFDMA time-frequency tile. The time duration of the time-frequency tiles used for transporting the M2M signal may be fixed or adjusted dynamically by the radio access system.

In another embodiment, embedding of the (low-rate) M2M signal is performed by superimposing the spread-spectrum waveform over the bandwidth range of the OFDMA baseband signal. In this case, the low-rate M2M direct sequence spread-spectrum waveform is directly superimposed to the high-rate OFDMA waveform, the waveform being typically spread out over the entire transmission bandwidth of the OFDMA signal. However, it may also be possible to use a spread-spectrum waveform which covers only part of the bandwidth of the OFDMA signal.

The rate of the M2M signal may be at least five times, in some cases at least ten times smaller than the rate of the OFDMA signal. Choosing the rate of the M2M signal considerably smaller than the rate of the OFDM signal is particularly useful for applying the superposition technique as described above, as in this case, cross-layer interference can be reduced and extraction of the M2M signal from the OFDM signal may be simplified, for example by low-pass filtering.

In any case, for extracting the embedded M2M signal from the OFDMA signal, joint detection or successive interference cancellation (SIC) may be performed. Thus, the extraction of the M2M signal can be simplified by joint detection/SIC techniques which are applied on the network receiver side. Also, signal transmission techniques with known interference may be applied on the transmitter side to minimize cross-layer interference. Using such advanced signal processing techniques, possibly in combination with network MIMO (multipoint transmission/reception, e.g. by providing an antenna array with a plurality of antenna elements spaced at a distance of approximately half of the center wavelength of the bandwidth spectrum), allows for leveraging the computing power of the installed base station infrastructure (especially for future systems such as 3GPP LTE) to reduce the impact of the low-rate overlay M2M signal in the host signal (OFDM) part.

One skilled in the art will appreciate that the method described above may be implemented in a computer program product, the latter being realized in a suitable software or hardware, in particular a field programmable gate array (FPGA) or an application-specific integrated circuit (ASIC), which may be realized as an in-line card to be plugged into a slot of an appropriate hardware, e.g. of a base station of an FPGA-based radio transmission system. One skilled in the art will readily appreciate that it is also possible to implement the method/computer program product as described above e.g. in an in-line card only being adapted for embedding the M2M signal into the OFDM signal and/or for extracting the M2M signal from the OFDM signal, the transmission/reception of the OFDM signal being performed in a conventional way in the hardware which is already deployed for this purpose, e.g. in a base station.

A further aspect relates to a transmission device, in particular to a base station for a wireless radio network, comprising: a generating unit adapted to generate an Orthogonal Frequency Division Multiple Access, OFDMA, signal, and a radio transmission unit for radio transmission of the OFDMA signal, the generating unit being adapted to embed a (low-rate) M2M signal as a spread-spectrum waveform into the bandwidth range of the OFDMA signal. The embedded M2M signal may then be transported as part of the OFDMA signal over the wireless network, the transmission unit comprising e.g. one or a plurality of RF antennas for this purpose.

It will be understood that in contrast to the transmission device as described above, the end terminals (sensor devices or other) which receive and transmit the M2M signals need not necessarily be adapted for processing the OFDMA signal. For example, when using an overlay in which the M2M signal is superimposed to the OFDMA signal, using a transceiver in the M2M terminals which is only adapted for processing M2M signals may be sufficient.

In one embodiment, the generating unit is adapted for embedding the spread-spectrum waveform of the M2M signal into narrow-band, unoccupied time-frequency tiles distributed over the bandwidth range of the OFDMA signal, thus implementing a frequency-hopped spread spectrum overlay radio M2M network which sends/transmits on sparse (spatially distributed) narrowband spectrum holes.

In an improvement of this embodiment, the generating unit is adapted to dynamically control the distribution of the narrow-band time-frequency tiles over the bandwidth range of the OFDMA signal, thus allowing dynamical self-management of by the radio access system/network to the joint needs of the M2M and of the Human-to-Human (H2H) and Human-to-Machine (H2M) transmissions, respectively.

In an alternative embodiment, the generating unit is adapted to superimpose the spread-spectrum waveform of the low-rate M2M signal over the bandwidth range of the OFDMA signal. Typically, the spread-spectrum waveform is spread out over the entire wavelength band occupied by the OFDMA signal to minimize cross-layer interference. Also, advanced transmission techniques using e.g. known interference can be applied on the transmitter side for further reducing cross-layer interference. Those skilled in the art will appreciate that some kind of coordination between the uplink transmissions of the superimposed M2M signals originating from different terminals is required, which may be achieved by performing appropriate signalling transported in the downlink signals from the transmission device.

Another aspect is implemented in a receiving device, in particular a base station for a wireless radio access system, comprising: a receiving unit for reception of an Orthogonal Frequency Division Multiple Access, OFDMA, signal, and an extraction unit adapted to extract a low-rate M2M signal from the OFDMA signal, the low-rate M2M signal having a spread-spectrum waveform being embedded into the OFDMA signal. The receiving device may be implemented in a machine terminal which extracts the required M2M information from the OFDMA signal. Alternatively, the receiving device may be implemented in a base station, the receiving device being e.g. implemented as an antenna or as an antenna array. The base station may be connected to a (core) computer network, such as the internet, and may be adapted to extract the M2M signal from the OFDMA signal for generating two separate data streams to be transmitted over the core network, the first (low-rate) data stream containing the information of the M2M signal, the second (high-rate) data stream containing information in the host OFDMA signal being used for H2M and H2H communications. It will be understood that the receiving device may also be implemented as an in-line card arranged e.g. in a base station, the receiving unit being adapted for receiving the OFDMA signal from an antenna/transceiver which is already deployed in the base station for performing transmission/reception of radio signals.

A final aspect relates to a wireless radio network adapted for performing Orthogonal Frequency Division Multiple Access, OFDMA, in particular according to the IEEE 802.16 (WiMAX), IEEE 802.11a/g (WLAN), or 3GPP eUTRAN (LTE/LTE-Advanced) standard, the wireless radio (access) network comprising at least one of a transmission device as described above and a receiving device as described above. It will be understood that the receiving device and the transmission device may be implemented as one and the same physical entity, in particular as a transceiver (card) which may be located e.g. in a base station of the radio access network.

Further features and advantages are stated in the following description of exemplary embodiments, with reference to the figures of the drawing, which shows significant details, and are defined by the claims. The individual features can be implemented individually by themselves, or several of them can be implemented in any desired combination.

BRIEF DESCRIPTION OF THE DRAWINGS

Exemplary embodiments are shown in the diagrammatic drawing and are explained in the description below. The following are shown.

DETAILED DESCRIPTION OF PREFERRED EMBODIMENTS

Figure 1:
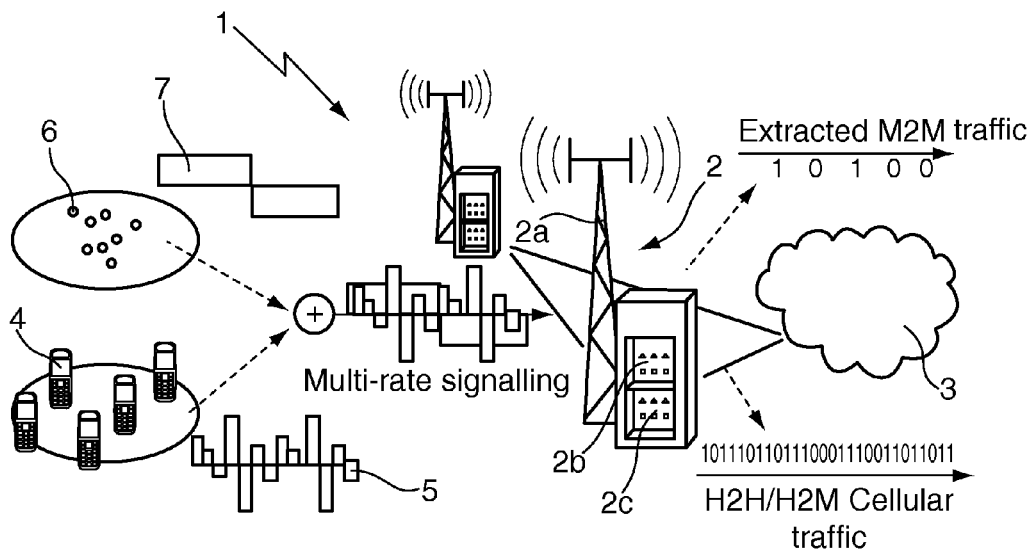
FIG. 1 shows a schematic diagram of an embodiment of a wireless radio access network for performing M2M communications.

FIG. 1 shows a radio access network 1 which is adapted for performing Orthogonal Frequency Division Multiple Access, OFDMA. The radio access network 1 may be compliant with at least one wireless communication standard, e.g. the IEEE 802.16 (WiMAX), IEEE 802.11a/g (WLAN), or 3GPP eUTRAN (LTE/LTE-Advanced) standard. The access network 1 comprises a number of base stations 2 which may be interconnected for coordinated transmission/reception of radio signals.

For transmitting OFDMA signals to end user terminals 4, the base station 2 comprises a radio transmission and reception unit 2a in the form of a radio antenna array (air interface), and a generating unit 2b being adapted to generate the OFDMA baseband signal which is transmitted over the air interface 2a.

At least one of the base stations 2 is connected to a data network 3, such as the internet, for providing broadband access to the plurality of mobile end user terminals 4 which are adapted to receive and transmit high data-rate OFDMA (host) signals 5. Moreover, the end user terminals 4 each comprise an end-user interface (not shown) for allowing the end users to have access to the core network 3 and/or to exchange data with other end user terminals 4.

The wireless communication network 1 of FIG. 1 also has a plurality of machine terminals 6. The machine terminals 6 may for example be sensor devices which allow measurement of certain physical properties such as pressure, temperature, etc. For sharing the measurement data among the machine terminals 6 and/or for transporting the measurement data over the core network 3 to a remote location, an overlay network for the machine-to-machine communication is implemented in the wireless communication network 1. Such an overlay network may be used as data transmitted/received by the end user terminals 4 is typically not relevant for the machine terminals 6 and vice versa. Moreover, M2M signals 7 of the machine terminals 6 typically have a lower data rate (e.g. by a factor of five or ten) as compared to the OFDMA host signals 5.

For implementing the overlay network in the wireless network 1 of FIG. 1, the low-rate M2M signal 7 is superimposed as a spread-spectrum waveform to the OFDMA host waveform 5 in the generating unit 2b of the base station 2 for downlink transmission of the combined signal to both the machine terminals 6 and the user terminals 4.

In the present example, the M2M signal 7 is directly superimposed to the OFDMA signal 5 (e.g. by adding amplitude or power levels of the two signals 7, 5), the M2M signal 7 being spread out over the entire bandwidth range $BW_{OFDMA}$ (cf. FIG. 2) of the OFDMA (baseband) signal 5 in order to keep cross-layer interference low. The machine terminals 6 have a transceiver (not shown) which is adapted to transmit and receive the low-rate M2M signal 7 within the spectral bandwidth of the OFDMA signal 5. It will be understood that in the uplink, coordinated transmission of M2M signals from different machine terminals 6 may be achieved using e.g. time-division multiple access, possibly based on signalling information contained in the OFDMA/M2M downlink signals from the base station 2. Also, for the extraction of the M2M signal 7 from the OFDMA signal 5, the machine terminals 6 need not be capable of processing the OFDMA signal 5 itself, i.e. the machine terminal 6 may only be adapted for processing the low-rate M2M signal 5, e.g. treating the contribution of the high-speed OFDMA signal 5 as noise. In the latter case, signalling information from the base station 2 is typically contained in the M2M downstream signal 5.

The base station 2 typically also comprises an extraction unit 2c adapted to extract the low-rate M2M signal 7 from the composite OFDMA signal 5. For this purpose, the extraction unit 2c may be equipped with a suitable processing device such as a low-pass filter. The data contained in the M2M signal 7 and in the OFDMA host signal 5 may then be transported in the form of separate data streams over the core network 3.

Figure 2:
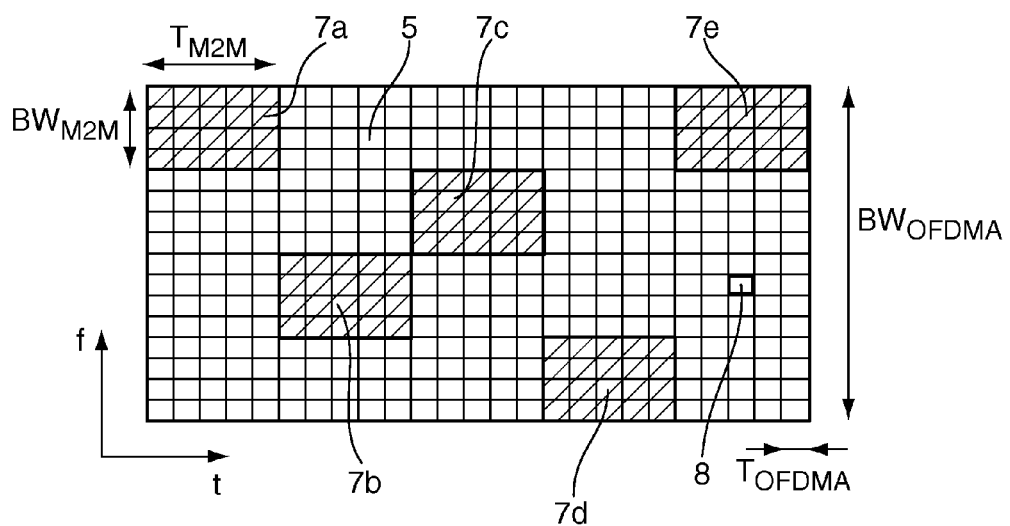
FIG. 2 shows a time-frequency diagram of an OFDMA host signal with an embedded spread-spectrum M2M waveform.

As an alternative to the direct superposition described above, the M2M signal 7 may be embedded into the OFDMA host signal 5 in a way which will be described in the following with reference to FIG. 2, representing a time-frequency diagram of the OFDMA signal 5. The OFDMA signal 5 is divided into a plurality of time-frequency tiles 8, each corresponding to a sub-carrier of the OFDMA format in the frequency domain and having a fixed time duration $T_{OFDMA}$, typically corresponding to the time duration of a transmitted symbol. As can also be gathered from FIG. 2, the OFDMA host signal 5 comprises a number of unoccupied time-frequency tiles 7a to 7e (also referred to as spectrum holes) which are distributed over the bandwidth range $BW_{OFDMA}$ of the OFDMA host signal 5 and which are used as a spread-spectrum waveform for transporting the M2M signal 7 in a coordinated way.

The distribution of the time-frequency tiles 7a to 7e which are used for transporting the M2M signal 7 can be self-managed dynamically by the radio access system 1 due to the joint needs of the M2M and H2M/H2H layers. In the example of FIG. 2, a fixed number of OFDMA sub-carriers (occupying four physical resource blocks) which is spread over the spectrum of the OFDMA signal 5 is used. Also, a fixed time duration $T_{M2M}$ of the time-frequency tiles 7a to 7e is used in the example of FIG. 2, the time duration $T_{M2M}$ being an integer multiple, e.g. five times, of the time duration $T_{OFDMA}$ of an OFDMA time-frequency tile 8. Of course, both the time duration and the number of sub-carriers which are occupied by the time-frequency tiles 7a to 7e may also be adjusted dynamically. In any case, the uplink transmissions from the machine terminals 6 and the user terminals 4 should be coordinated in this case, e.g. by providing downlink signaling from the base station 2.

In both cases described above, for extracting the embedded M2M signal 7 from the OFDMA signal 5, joint detection and/or successive interference cancellation (SIC) may be preformed in the extraction unit 2c of the base station 2 and/or in the machine terminals 6. Also, advanced signal processing techniques such as signal transmission with known interference can be applied in the generating unit 2b of the base station 2 and possibly also in the machine terminals 6 to minimize cross-layer interference. One skilled in the art will appreciate that other advanced signal processing techniques, such as network MIMO (multipoint transmission/reception) may be applied as well in order to reduce the impact of the low-rate overlay M2M signal 7 to the host signal (OFDM) part 5.

In summary, embedding of the M2M signal 7 into the OFDMA signal 5 allows to make maximum re-use of existing infrastructure as well as to apply sophisticated signal processing on the network side, leveraging the huge base-band processing power/backhauling capability of deployed 4G cellular base-stations, possibly with application of joint detection/transmission techniques of the M2M/cellular signal layers. In particular, the M2M signalling capability may be implemented as a software upgrade to existing base stations 2.

One skilled in the art will appreciate that an overlay network of the type described above is not restricted to communications between machine terminals, as also other types of signals may also be transported in an overlay network of this kind. Typically, however, the data rate of the signals distributed across the overlay network will be reduced with respect to the data rate of the OFDMA host signals, in particular the latter property qualifying the signals transmitted in the overlay network as "M2M signals".

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as defined by the appended claims, and equivalents thereof.

The invention claimed is:

1. A method for transporting a machine-to-machine, M2M, signal over a wireless radio network using an Orthogonal Frequency Division Multiple Access, OFDMA, signal, the method comprising:
   embedding the M2M signal as a spread-spectrum waveform into a bandwidth range ($BW_{OFDMA}$) of the OFDMA signal, and
   transporting the OFDMA signal containing the M2M signal which has a lower data rate than the OFDMA signal over the wireless radio access network;
   wherein the spread-spectrum waveform of the M2M signal is embedded into narrow-band, and unoccupied time-frequency tiles are distributed over the bandwidth range ($BW_{OFDMA}$) of the OFDMA signal;
   wherein the unoccupied time-frequency tiles each comprise a plurality of subcarriers such that the unoccupied time-frequency tiles are of a common size relative to each other.

2. A method according to claim 1, wherein the distribution of the narrow-band time-frequency tiles over the bandwidth range ($BW_{OFDMA}$) of the OFDMA signal is dynamically controlled.

3. A method according to claim 1, wherein the narrow-band, unoccupied time-frequency tiles cover a fixed number of sub-carriers of the OFDMA baseband signal.

4. A method according to claim 1, wherein the narrow-band time-frequency tiles of the M2M signal have a time duration ($T_{M2M}$) which is an integer multiple of the time duration ($T_{OFDMA}$) of an OFDMA time-frequency tile.

5. A method according to claim 1, wherein embedding of the low-rate M2M signal is performed by superimposing the spread-spectrum waveform over the bandwidth range ($BW_{OFDMA}$) of the OFDMA baseband signal.

6. A method according to claim 1, wherein the rate of the M2M signal is at least five times, preferably at least ten times smaller than the rate of the OFDMA signal.

7. A method according to claim 1, wherein for extracting the embedded M2M signal from the OFDMA signal at least one of joint detection and successive interference cancellation is performed.

8. A method according to claim 1, wherein for transporting the OFDMA signal over the wireless radio access network, at least one of multipoint transmission and multipoint reception is performed.

9. A transmission device, in particular base station, for a wireless radio network, comprising:
   a generating unit that generates an Orthogonal Frequency Division Multiple Access, OFDMA, signal, and
   a radio transmission unit that transmits the OFDMA signal, wherein
   the generating unit embeds a M2M signal which has a lower data rate than the OFDMA signal as a spread-spectrum waveform into a bandwidth range ($BW_{OFDMA}$) of the OFDMA signal;
   wherein the generating unit embeds the spread-spectrum waveform of the M2M signal into narrow-band, unoccupied time-frequency tiles distributed over the bandwidth range ($BW_{OFDMA}$) of the OFDMA signal;
   wherein the unoccupied time-frequency tiles have a common size and each comprise a plurality of subcarriers.

10. A transmission device according to claim 9, wherein the generating unit dynamically controls the distribution of the narrow-band time-frequency tiles over the bandwidth range ($BW_{OFDMA}$) of the OFDMA signal.

11. A transmission device according to claim 9, wherein the generating unit superimposes the spread-spectrum waveform of the M2M signal over the bandwidth range ($BW_{OFDMA}$) of the OFDMA signal.

12. A receiving device, in particular base station, for a wireless radio access system, comprising:
   a receiving unit that receives an Orthogonal Frequency Division Multiple Access, OFDMA, signal, and
   an extraction unit that extracts a M2M signal which has a lower data rate than the OFDMA signal from the OFDMA signal, the M2M signal having a spread-spectrum waveform being embedded into the OFDMA signal;
   wherein the spread-spectrum waveform of the M2M signal is embedded into the OFDMA signal as a plurality of narrow-band, unoccupied time-frequency tiles distributed over the bandwidth range ($BW_{OFDMA}$) of the OFDMA signal;
   wherein the unoccupied time-frequency tiles have a common size and each comprise a plurality of subcarriers.

13. A wireless radio network, in particular according to the IEEE 802.16, IEEE 802.11a/g, or 3GPP eUTRAN (LTE/LTE-Advanced) standard, adapted for performing Orthogonal Frequency Division Multiple Access, OFDMA, and comprising at least one of a transmission device according to claim 10 and a receiving device according to claim 12.

* * * * *